Figure 2C:
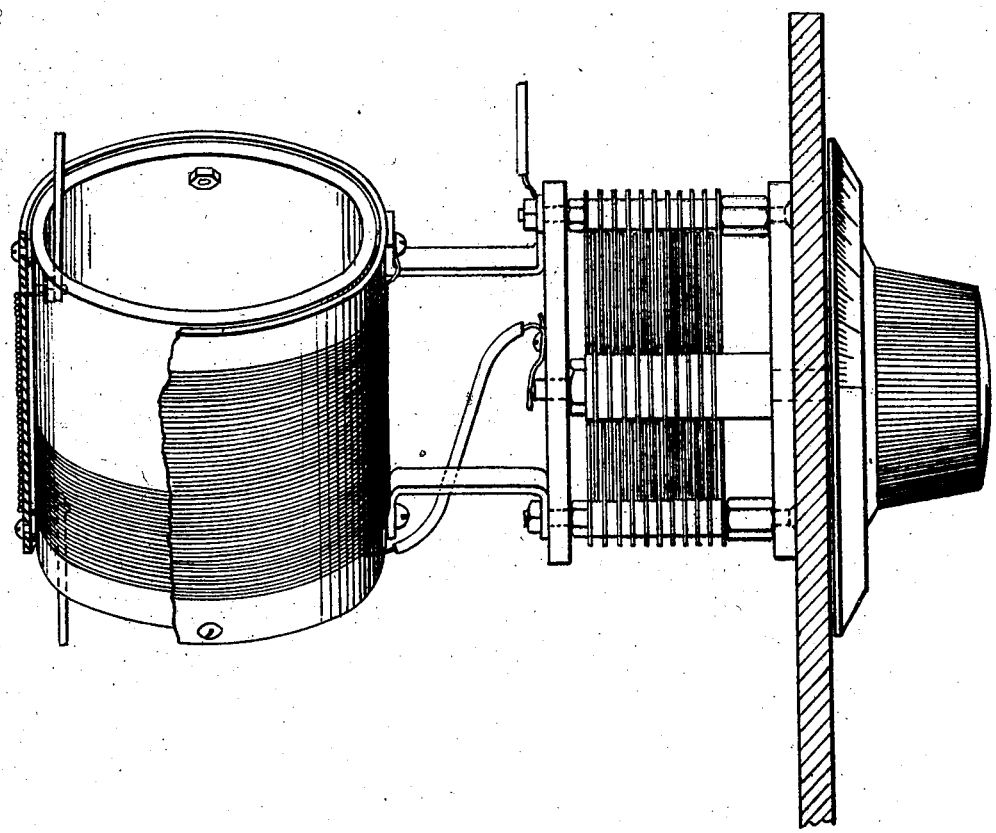

March 16, 1926.
L. A. HAZELTINE
1,577,421
MEANS FOR ELIMINATING MAGNETIC COUPLING BETWEEN COILS
Filed April 7, 1924  3 Sheets-Sheet 1
Fig. 1
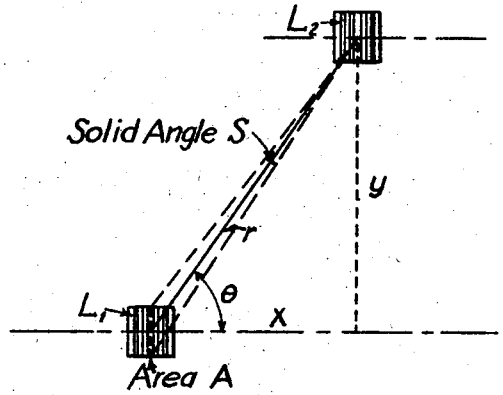
Fig. 2a
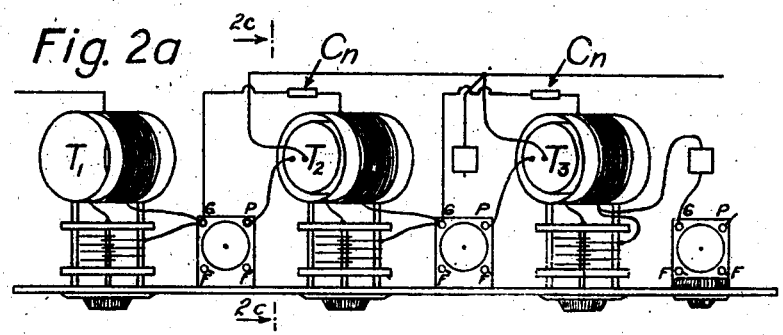
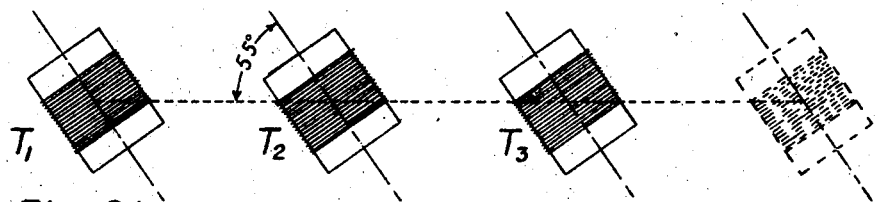
Fig. 2b
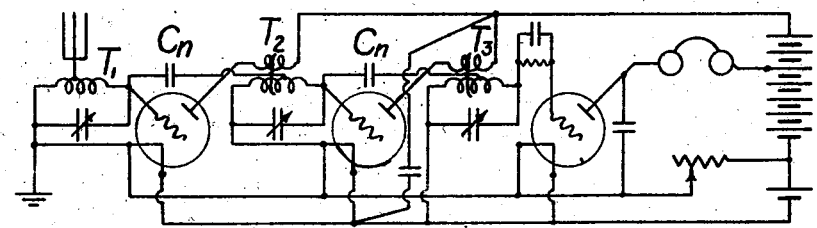
Fig. 2d
INVENTOR
BY
ATTORNEYS March 16, 1926.

L. A. HAZELTINE 1,577,421

MEANS FOR ELIMINATING MAGNETIC COUPLING BETWEEN COILS

Filed April 7, 1924  3 Sheets-Sheet 2

INVENTOR
Louis A. Hazeltine
BY
Pennie, Davis, Marvin & Edmonds.
ATTORNEYS

Patented Mar. 16, 1926.

1,577,421

UNITED STATES PATENT OFFICE.

LOUIS A. HAZELTINE, OF HOBOKEN, NEW JERSEY, ASSIGNOR TO HAZELTINE CORPORATION, A CORPORATION OF DELAWARE.

MEANS FOR ELIMINATING MAGNETIC COUPLING BETWEEN COILS.

Application filed April 7, 1924. Serial No. 704,629.

*To all whom it may concern:*

Be it known that I, LOUIS A. HAZELTINE, a citizen of the United States, residing at No. 1024 Hudson Street, Hoboken, in the county of Hudson, State of New Jersey, have invented certain new and useful Improvements in Means for Eliminating Magnetic Coupling Between Coils; and I do hereby declare the following to be a full, clear, and exact description of the invention, such as will enable others skilled in the art to which it appertains to make and use the same.

This invention relates to wave signaling systems, particularly radio and high-frequency carrier-current or line-radio systems, employing a plurality of coils, and has for its object the elimination of undesired magnetic coupling between such coils.

For many electrical purposes, particularly in radio communication systems, it is common to employ coils each having an open magnetic circuit of non-magnetic material. The simplest and most readily constructed coil is circular, that is, all of its turns are coaxial circles, except for the effect of the winding pitch. The current in such a coil produces a magnetic flux extending a distance in all directions and in general linking with other coils that may be in the neighborhood, thus giving rise to magnetic coupling between the coils. To avoid such magnetic coupling between two coils it has been customary to mount them with the axis of one lying in the midplane of the other, the two axes being at right angles. Three coils can be mounted in this way so that there is no coupling between any two, but this cannot be done with more than three coils because no more than three directions mutually at right angles exist in three-dimensional space. Further, this method of mounting is not convenient, as each coil has to be mounted in a different manner. A less usual method of avoiding magnetic coupling is to enclose each coil completely in a metal compartment, but this more complicated construction is usually not desired, and the eddy-current loss in the metal walls may be objectionable.

The purpose of this invention is to arrange a plurality of coils so that all of them may be mounted in a similar manner characterized by the absence of magnetic coupling between any two. For this purpose the centers of the coils should lie in the same straight line and the axes should be parallel. It remains, then, to determine the proper angle between each axis and the line of centers of the coils. This angle has been computed to be that angle whose tangent is $\sqrt{2}$, or approximately 54.7°. However, for all practical purposes the angle may be considered to be substantially 55°, although proximate influences such as wires, apparatus, etc., frequently result in a difference in the angle of zero magnetic coupling from the calculated value by from 1 to 3 degrees.

A more complete understanding of this invention may be had from a consideration of the following description of a preferred embodiment together with the accompanying drawings, in which—

Figure 3A:
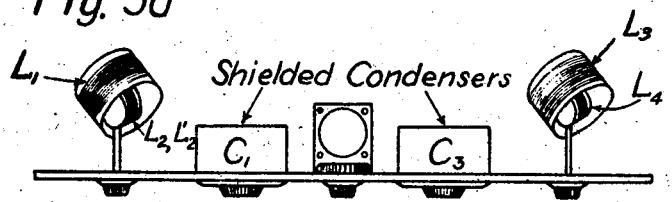
Figure 3B:
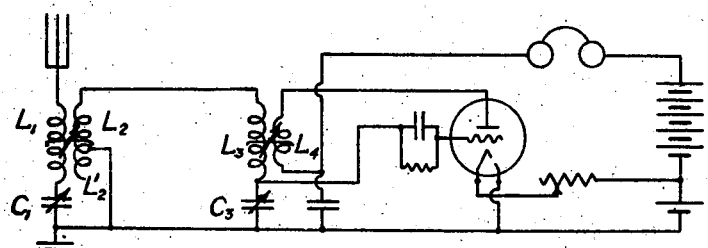
Figure 4:
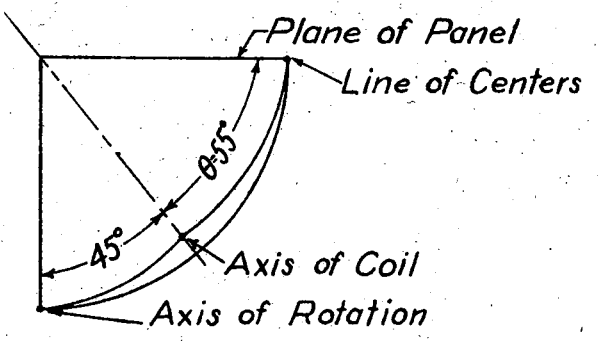

Fig. 1 illustrates the derivation of the coil angle;

Fig. 2$^a$ is a top view of an assembled multistage tuned radio-frequency amplifier;

Fig. 2$^b$ is a front view showing the angle at which the coils of Fig. 2$^a$ are placed relative to one another and to their line of centers;

Fig. 2$^c$ is a side view showing in detail the structure of one condenser-coil unit taken from Fig. 2$^a$;

Fig. 2$^d$ is a diagram of connections employed in the amplifier illustrated in Fig. 2$^a$;

Fig. 3$^a$ is a top view of an assembled coupled-circuit regenerative radio receiver to which this invention has been applied;

Fig. 3$^b$ is a circuit diagram of the connections employed in the regenerative radio receiver shown in Fig. 3$^a$, and Fig. 4 shows the method of locating the coil angle in Figs. 3$^a$ and 3$^b$.

Referring to Fig. 1, reference characters $L_1$ and $L_2$ denote two coils whose axes are horizontal and in the plane of the drawing and whose dimensions are small in comparison with the distance $r$ between them. It is well known that the magnetic potential at any point due to a current in a linear circuit is proportional to the solid angle subtended at the point by the circuit. Hence, the magnetic potential at $L_2$ due to a current in $L_1$ will be proportional to $$S = \frac{A \cos \theta}{r^2} = \frac{Ax}{(x^2+y^2)^{3/2}},$$

where the symbols have the meanings indicated on the figure. The horizontal component of the magnetic intensity at $L_2$ will then be proportional to $$\frac{dS}{dx} = \frac{A(y^2 - 2x^2)}{(x^2 + y^2)^{5/2}}.$$

This will evidently be zero when $$y^2 = 2x^2;$$

so that $$\tan \theta = \frac{y}{x} = \sqrt{2}.$$

When the horizontal component of the magnetic intensity at $L_2$ is zero, or, more precisely, the magnetic flux of $L_1$ will pass thru $L_2$ at an effective average angle of 90° to the axis of $L_2$, with the result that no magnetic flux will link with $L_2$, so there will be no coupling between the coils. The above equation thus gives the desired angle $\theta$ as the angle whose tangent is $\sqrt{2}$, which is approximately 54.7°, or substantially 55°. It may be noted incidentally that this angle is equal to the angle between the diagonal and one edge of a cube. While the above derivation applies strictly only when the coils are far apart relative to their dimensions, yet it has been found by experiment that coils whose axial length is two-thirds their diameter may be brought almost into contact without changing the value of the angle for zero coupling by more than a very few degrees. In particular, when the radial distance between the coils is reduced to one-sixth their diameter, the angle increases only to 57°; when the radial distance between the surfaces is equal to the diameter, the angle is not distinguishable from the ideal approximate value of 55°. (The ratio two-thirds of the axial length to diameter, gives approximately the lowest resistance for a single-layer solid-wire coil at high frequency with a given self-inductance and a given volume occupied by the coil.)

In radio-frequency amplifiers, particularly tuned radio-frequency amplifiers, it is desirable and usually necessary to eliminate coupling between the input circuit and the output circuit of each vacuum tube. Capacity coupling may be eliminated by introducing a capacity which neutralizes the coupling capacity of the vacuum tube and connections, as described in my United States Letters Patent Nos. 1,489,228 and 1,533,858. Magnetic coupling between the transformers may conveniently be eliminated in accordance with the present invention by the arrangement illustrated in Figs. $2^a$, $2^b$ and $2^d$.

Fig. $2^a$ is a top view of a two-stage tuned radio-frequency amplifier and detector showing in particular three transformers $T_1$, $T_2$ and $T_3$. These transformers are shown in elevation in Fig. $2^b$ and the complete diagram of connections is shown in Fig. $2^d$. The secondary coils of these transformers are wound on insulating cylinders. The primary coils of $T_2$ and $T_3$ are also wound on insulating cylinders and are placed inside the respective secondaries; $T_1$ is made an auto-transformer for convenience. All secondary windings are tuned by variable condensers connected across them. The primary circuits have relatively small capacities and the primary coils have usually much fewer turns than the secondary coils, hence the radio-frequency currents in the primary circuit have a very small magnetic effect as compared with the radio-frequency currents in the secondaries. It is therefore the secondary coils which particularly should have zero magnetic coupling.

Fig. $2^b$ shows the secondary coils, each mounted with an angle of 55° between its axis and the line of centers, thus giving zero magnetic coupling, as explained above. This figure also indicates by the dotted coil at the right that all of the coils may be similarly arranged when more than two stages of radio-frequency are employed. A very compact and convenient arrangement results from mounting on the back of each variable condenser its associated transformer, as illustrated in Fig. $2^a$, and in more detail in Fig. $2^c$. This arrangement not only introduces the practical advantages of short connections, but thereby also minimizes capacity effects. By thus mounting each coil rigidly to its associated variable condenser, which in turn may be secured to a panel as illustrated in Figs. $2^a$ and $2^c$, the coil may be readily placed at the desired angle, with the assurance that this angle will be permanently maintained.

In applying this invention, care should be taken to keep masses of metal, particularly magnetic metal, and closed electric circuits, as far as practicable out of the magnetic fields of the coils, for these would tend to distort the flux paths and so cause magnetic coupling. The loop formed by the leads of each coil may have a slight effect on the coil angle. On account of unavoidable disturbing features of this sort, it may be desirable to adjust the coil angle finally by experiment. In the amplifier shown in Figs. $2^a$, $2^b$ and $2^d$, this result is attained by setting the coil angle so that the adjustment of the neutralizing capacities $C_n$, which gives a zero resultant coupling between stages, is found to be the same at long, as at short wave lengths; for this result indicates that the capacity coupling is not being called upon to balance magnetic coupling. Experience in making these adjustments indicates that for zero magnetic coupling, this deviation of the coil angle from its theoretical value of approximately 55° is so slight as usually to be negligible.

While the foregoing embodiment of the present invention is exemplified in tuned radio-frequency transformers, it is to be understood that the invention is equally applicable to untuned transformers of radio, or of low-frequency type, or to any form of coils between which zero magnetic coupling is desired.

Another useful embodiment of this invention is its application to a common form of coupled-circuit regenerative receiver having a tuned primary circuit adjustably coupled with a tuned secondary circuit, the latter circuit being adjustably coupled with a coil in the plate circuit of the detector tube. Such a receiver is illustrated in Figs. 3$^a$ and 3$^b$, where $L_1$ is the primary or antenna coil, $L_2$ is the coupling coil movable with respect to $L_1$, $L_3$ is the main secondary inductance coil, and $L_4$ is the plate coil movable with respect to $L_3$. In order to obtain convenient control of the coupling between the primary and secondary circuits, it is desirable to eliminate all capacity coupling between these circuits and to have all of the magnetic coupling exist between coils $L_1$ and $L_2$. Capacity coupling between the variable condensers $C_1$ and $C_3$ is here avoided by electrostatically shielding these condensers, as indicated in Fig. 3$^a$. Capacity coupling between coils $L_1$ and $L_3$ is reduced to a negligible amount by spacing them some distance apart with large grounded conductors interposed between the coils. Capacity coupling between coils $L_1$ and $L_2$ is neutralized by the use of the auxiliary coil $L'_2$, as described in my United States Letters Patent No. 1,450,080, issued March 27, 1923. The remaining undesired coupling, i. e., the magnetic coupling between coils $L_1$ and $L_3$, is eliminated in accordance with the present invention by mounting these coils, as illustrated in Fig. 3$^a$, with their axes parallel and inclined at an angle of substantially 55° to the line of centers. In this case, however, it is convenient to mount the coils with their axes also at 45° to the axis of rotation of coils $L_2$ and $L_4$; for this arrangement permits of varying the coupling from zero to maximum while turning coils $L_2$ and $L_4$ through an angle of 180°, thus giving a fine control of the coupling. The direction of the axes of the fixed coils may be determined as indicated in Fig. 4, which represents a tri-rectangular spherical triangle whose corners correspond to the three coordinate axes of Fig. 3$^a$.

The general case of zero magnetic coupling between two coils whose dimensions are small in comparison with the distance between them may on occasion be of interest, and the necessary relations will therefore be given. If the axes of the coils are in the same plane, the condition for zero magnetic coupling is that the product of the tangents of the angles between the axes and the line of centers shall be equal to 2, the two angles being taken in the same way. In the special case when these two angles are equal to each other, making the axes parallel, this reduces to the relation that the square of the tangent shall be equal to 2, or that the tangent itself shall be equal to $\sqrt{2}$, as discussed previously. In the most general case when the axes of the two coils are not in the same plane, one axis should be projected into the plane containing the other axis and the line of centers. Then the general condition for zero magnetic coupling is that the product of the tangents of two angles shall again be equal to 2, one of these angles being between the second axis and the line of centers and the other being between the projection and the line of centers, both angles being taken in the same way.

I claim:

1. In an electric coil system comprising a plurality of coils whose length is approximately two-thirds the diameter, the method of eliminating undesirable magnetic coupling between the coils thereof, which comprises arranging said coils with their axes parallel and with their centers on the same straight line and disposing each of said axes at an angle of approximately 55 degrees to the line of centers of said coils, whereby substantially no magnetic flux produced by the electric current in any of said coils is linked with any other of said coils.

2. An electric coil system comprising two coils so arranged with relation to each other that the product of the tangent of the angle between the line of centers of said coils and the axis of one of said coils and the tangent of the angle between the line of centers and the projection of the axis of the other coil upon the plane determined by the line of centers and the axis of the first coil, is equal to two, the value of said tangents lying between, but not including zero and infinity, said coils being spaced at a distance apart large compared with the dimensions of the coils whereby substantially no magnetic flux produced by an electric current in one of said coils is linked with the other of said coils.

3. An electric coil system comprising two coils, whose dimensions are small in comparison with the distance between them and so arranged with relation to each other that the product of the tangent of the angle between the line of centers of said coils and the axis of one of said coils and the tangent of the angle between the line of centers and the projection of the axis of the other coil upon the plane determined by the line of centers and the axis of the first coil, is equal to two, the value of said tangents lying between, but not including zero and infinity, whereby substantially no magnetic flux produced by an electric current in one of said coils is linked with the other of said coils.

4. An electric coil system characterized by the absence of magnetic coupling between the coils thereof, which comprises a plurality of coils arranged with their centers on the same straight line and with their axes parallel, said axes being disposed at an angle of approximately 55 degrees to the line of centers of said coils, said coils being spaced such a distance apart that the magnetic flux produced by any one of the coils will pass thru each other coil at an effective average angle of 90° to the axis of said other coil.

5. An electric coil system characterized by the absence of magnetic coupling between the coils thereof, which comprises a plurality of non-magnetic core coils arranged with their centers on the same straight line and with their axes parallel, said axes being disposed, with reference to the line of centers of said coils, at that angle whose tangent is the square root of two, said coils being spaced such a distance apart that the magnetic flux produced by any one of the coils will pass thru each other coil at an effective average angle of 90° to the axis of said other coil.

6. An electric coil system characterized by the absence of magnetic coupling between the coils thereof, which comprises a plurality of coils arranged with their axes in the same plane, each of said axes being disposed, with reference to the line of centers of said coils, at that angle whose tangent is the square root of two, said coils being spaced such a distance apart that the magnetic flux produced by any one of the coils will pass thru each other coil at an effective average angle of 90° to the axis of said other coil.

7. A radio-frequency transformer-coupled amplifier, characterized by the absence of magnetic coupling between the transformers thereof, which comprises an arrangement of the transformers with their centers on the same straight line and with their axes parallel, said axes being disposed, with reference to the line of centers of said transformers, at that angle whose tangent is the square root of two, said transformers being spaced such a distance apart that the magnetic flux produced by any one of the transformers will pass thru each other transformer at an effective average angle of 90° to the axis of said other transformer.

8. In an electric coil system, a plurality of coils arranged in a row, said coils being spaced such a distance apart that the magnetic flux produced by any one of the coils will pass thru each other coil at an effective average angle of 90° to the axis of said other coil, the axes of said coils being in the same plane and similarly inclined to a common reference line intersecting said coils whereby the magnetic coupling between said coils is reduced to a minimum.

9. In an electric coil system, a plurality of spaced coils arranged in a row, the length of each coil being approximately two-thirds its diameter, the axes of said coils being in the same plane and similarly inclined to a common reference line intersecting said coils whereby the magnetic coupling between said coils is reduced to a minimum.

10. In an electric coil system comprising a plurality of spaced coils, the method of eliminating undesirable magnetic coupling between the coils thereof which comprises arranging said coils in a row and with the axes of the coils in the same plane, inclining said axes similarly to a common reference line intersecting said coils, and spacing said coils at such a distance apart that the magnetic flux produced by any one of the coils will pass thru each other coil at an effective average angle of 90° to the axis of said other coil.

In testimony whereof I affix my signature.

LOUIS A. HAZELTINE.